Oct. 7, 1947.  W. R. WEEKS  2,428,642
TEMPERATURE CONTROL SYSTEM
Filed April 27, 1946
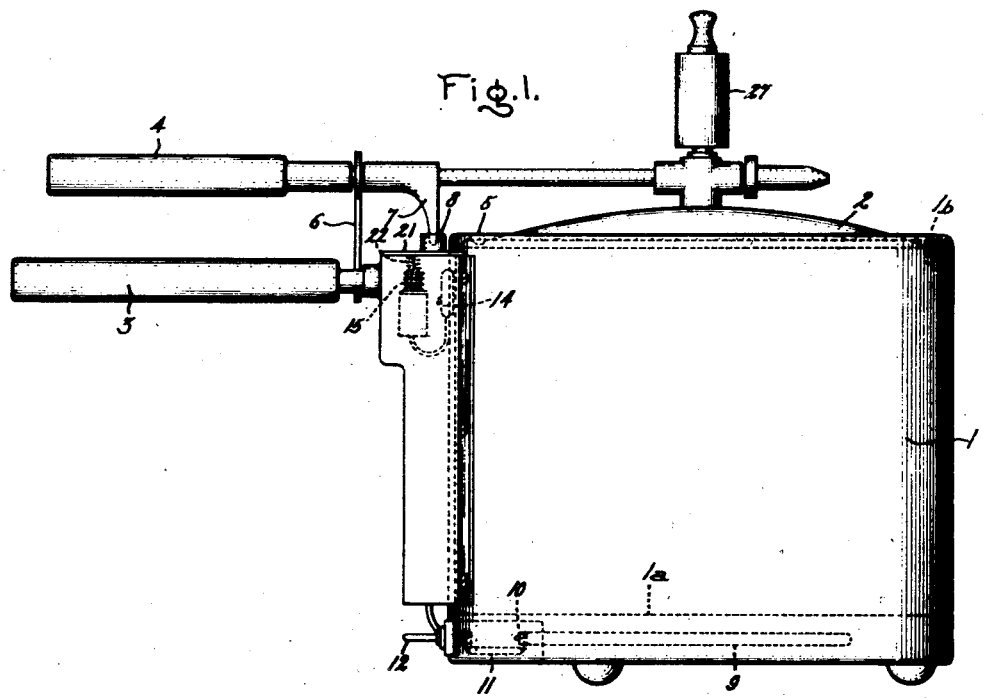
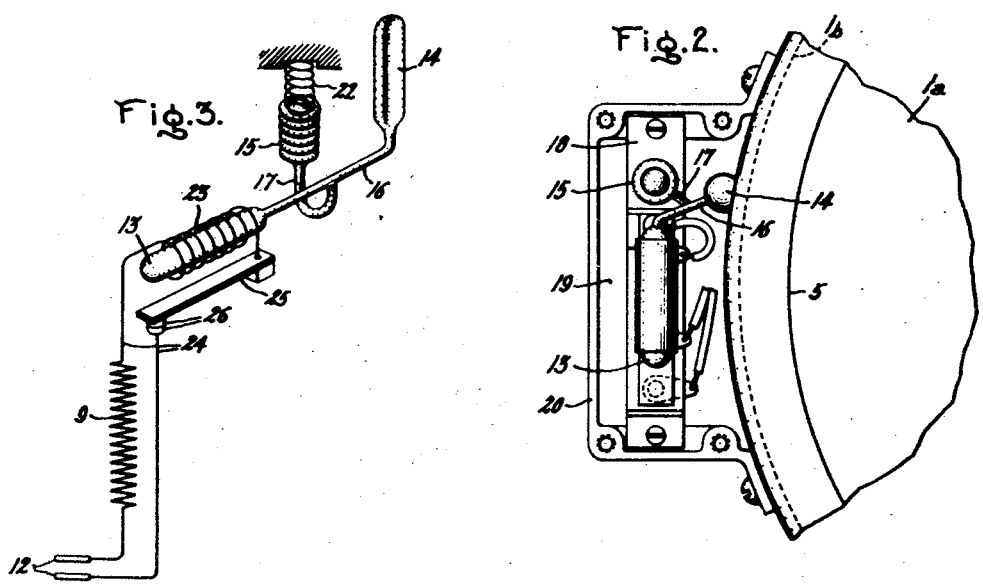
Inventor:
Walter R. Weeks
by Alfred E. Bobst
His Attorney.

Patented Oct. 7, 1947

2,428,642

UNITED STATES PATENT OFFICE 2,428,642

TEMPERATURE CONTROL SYSTEM

Walter R. Weeks, Hamden, Conn., assignor to General Electric Company, a corporation of New York Application April 27, 1946, Serial No. 665,363

6 Claims. (Cl. 236—32)

1

This invention relates to temperature control systems, more particularly to such systems for controlling the temperature and hence the pressure in electrically-heated pressure cookers, and the like, and it has for its object the provision of improved control means of this character.

The control means of this invention comprises a closed fluid heat-transfer system which includes a vaporizer and a condenser. The condenser "feels" the temperature of the cooker, so-to-speak, and for this purpose is placed in heat-conducting relation with the cooker. The vaporizer is not heated by the cooker, but is provided with separate heating means. The closed fluid system is charged with a vaporizable medium, and is so arranged that medium in the liquid phase flows into the vaporizer for vaporization. The medium in the condenser that is in the vapor phase condenses and flows back into the vaporizer—provided the temperature of the condenser, which is the cooker temperature, is below the desired value. In this way heat is transferred from the vaporizer to the condenser. The fluid system further comprises a control chamber which has a variable volume, and has associated therewith a bias means which tends to reduce its volume with a predetermined force. As the cooker temperature rises that of the condenser rises, and as a result the pressure in the vaporizer-condenser sub-system increases. This increase in pressure causes liquid to flow from the vaporizer-condenser system into the control chamber, this chamber expanding against the force of its bias means as the liquid is forced in. When the temperature of the cooker and condenser attains the desired high value all of the liquid in the sub-system will have been forced into the control chamber. Since there is no longer any liquid in the vaporizer to be vaporized heat is no longer transferred from the vaporizer and its temperature rises rapidly. Thermostatic means are provided which control the heating means for the cooker and of the vaporizer to cut down the heat responsively to this rise in the vaporizer temperature. Now the cooker and vaporizer temperatures fall, and as a result the medium in the condenser—now in the vapor phase—will condense, which action reduces the pressure in the condenser-vaporizer sub-system. When this pressure falls the control chamber forces liquid back into the vaporizer. This element vaporizes the liquid and thereby causes the temperature of the vaporizer to fall, which in turn causes the thermostatic means to increase the heat both to the vaporizer and the cooker; and the afore-described cycle repeats. In this way the cooker temperature is held at a substantially constant value.

For a more complete understanding of this invention, reference should be had to the accompanying drawing in which Fig. 1 is a side elevation of an electrically-heated pressure cooker embodying this invention; Fig. 2 is an enlarged fragmentary plan view of the cooker shown in Fig. 1, parts being removed so as to illustrate certain structural details; and Fig. 3 is a diagrammatic perspective view illustrating certain elements of the control for the cooker.

Referring to the drawing, this invention has been shown in one form as applied to an electrically-heated pressure cooker comprising a relatively-deep open-top cooking receptacle 1 having a bottom wall 1a and an upright cylindrical side wall 1b. Preferably, these walls will be cast together from a suitable heat-conducting material, such as aluminum. A lid 2 is provided for closing the top of the receptacle. The receptacle has a laterally-extending handle 3 adjacent its upper edge, and the lid has a laterally-extending handle 4. The lid is of the flexible type and is held up in pressure-sealing relation against a flange 5 extending inwardly from the top of the cylindrical side wall 1b by means of a latch 6 pivoted on handle 4 and hooked onto handle 3, the handle 4 pivoting on a fulcrum 7 attached to the handle and which is received in a socket 8 provided for it on the receptacle. Such a lid-sealing arrangement is described and claimed in the United States patent to A. Vischer, Jr., No. 2,282,011, dated May 5, 1942.

The receptacle 1 is heated by an electric resistance heating element 9 which applies heat to the bottom wall 1a. This heating element preferably will be of the sheathed type, and preferably will be cast into the bottom wall. It is provided with terminals 10 which are connected by leads 11 to one of twin supply terminals 12.

The energization of the heating element 9 is controlled so as to apply such heat to receptacle 1 that a constant pressure is maintained in the cooker. The temperature control means for the heater comprises a vaporizer chamber 13, a vapor condenser chamber 14 and a control chamber 15. Chambers 13 and 14 are interconnected by a pipe 16, and chamber 15 is interconnected with chambers 13 and 14 by a pipe 17 connecting chamber 16 with the pipe 16, as shown. The pipes 16 and 17 function to connect the three chambers into a closed fluid system. The two chambers 14 and 15 are elevated with respect to chamber 13, as shown in Fig. 3.

The closed fluid system of chambers and pipes is mounted upon a support 18 which in turn is mounted in the upper part of a chamber 19 defined by a casing 20 attached to the side wall of the receptacle 1, as shown. This chamber is provided with a top cover 21.

Chamber 15 is of the expansible, contractible type and preferably will be in the form of a bellows, as shown. It is biased to contract to thereby reduce the volume of the chamber by means of a compressing spring 22.

The control chamber 15 is located in the housing 20 at a point relatively remote from the side wall 1b of the cooker. The condenser 14, on the other hand, is positioned in direct contact with this side wall, and while it is generally of cylindrical shape the wall thereof which contacts side wall 1b is shaped to conform to the shape of the wall, whereby the chamber is placed in good heat-transfer relation with the cooker. The vaporizer 13 also is out of thermal contact with the side wall 1b.

The vaporizer 13, however, is heated by a separate heater consisting of a resistance heating element 23 which is formed as a coil surrounding the vaporizer. This heater is connected in series with the main cooker heater 9 by leads 24; and interposed in these leads is a bimetallic temperature-responsive element 25 which is positioned close to the vaporizer so as to respond to its temperature, and which controls switch contacts 26 connected in series in the energizing circuit of the two heaters. The thermostat is arranged to open the switch contacts at a predetermined high temperature and to reclose them when the temperature falls by a predetermined amount.

The closed fluid system comprising the three chambers 13, 14, and 15 is loaded with a quantity of a suitable vaporizable liquid, such as alcohol. Before this medium is loaded into the system, the system is first completely evacuated and then the alcohol is introduced into the system in the vapor phase. While it is introduced the two chambers 13 and 14 are heated by any suitable means (not shown) to a temperature of 250° F.; the chamber 15 is not heated and therefore has a lower temperature. The vapor that flows into the chamber 15 therefore condenses, and vapor is fed into the system until the chamber 15 and the tube 17 are filled with liquid alcohol. When this occurs the supply of vapor is shut off and the fluid system sealed. As the pressure in the chambers 13 and 14, which are heated, is relatively high (about eighty pounds gage in the embodiment illustrated), the chamber 15 will be filled, that is will be forced to its fully-expanded position. The temperature of 250° F. at which chambers 13 and 14 are heated while the system is being loaded is chosen because it is the critical temperature at which the cooker will be operated while cooking in order to effect the desired cooker pressure, fifteen pounds per square inch in this case. If a different cooker pressure is desired, the chambers 13 and 14 will be heated at a temperature equal to the cooker temperature which will provide the desired pressure.

After the system has been so loaded with the alcohol the chambers 13 and 14 are allowed to cool down. As they cool the pressure in them falls and the chamber 15 collapses and forces the liquid therein out into the vaporizer 13.

The system is now ready to control. Assuming that the cooker is loaded with the food to be cooked, and the lid 2 is sealed on, and the terminals 12 plugged into an electrical supply source, then the two heaters 9 and 23 will heat up simultaneously, the former heating the receptacle 1 and the latter heating the vaporizer 13. The heat generated in the vaporizer will evaporate the liquid alcohol therein and the vapor generated will be forced into the condenser 14 where it will condense because the walls of the condenser are relatively cool, these walls being in contact with the relatively cool wall 1b of the cooker. The condensate created in the condenser will flow back into the vaporizer where it again will be evaporated and forced up into the condenser which again will condense the vapor. This cycling action will continue, but all of this time the condenser temperature will be increasing with the increasing wall temperature of the cooker, which of course is being continuously heated by the heater 9. As the temperature of the condenser 14 rises the pressure in the fluid system rises and some of the liquid is forced from the vaporizer-condenser sub-system into the expansible control chamber 15, and therefore is taken out of circulation between the vaporizer and condenser. When the condenser temperature reaches 250° F. which is the cooker temperature corresponding to a fifteen pound cooker pressure, the pressure in chamber 13 and 14 will be so high that all of the liquid in the system will be forced into chamber 15, the spring 22 yielding to permit this chamber to expand and receive the liquid. (Note that we now have the condition to which the fluid system was adjusted when initially loaded with the alcohol.) As a result, no alcohol will drain into the vaporizer for revaporization, and since heater 23 is still applying heat to the vaporizer and none of the heat is being carried away by vaporization, the temperature of the vaporizer will rise quickly and cause thermostat 25 to operate to open switch 26 and deenergize the heater 23, and simultaneously therewith deenergize the main heater 9. The thermostat 25 should be set to open at a temperature of from about 260° F. to 300° F.

The cooker then will begin to cool, and when its side wall 1b and the condenser 14 fall below 250° F., the vapor in the condenser will condense and thereby reduce the pressure in the system with the result that liquid will be forced out of the chamber 15 and into the vaporizer where it will be vaporized and the vapor forced into the chamber 14. This carries heat away from the vaporizer and quickly will cool it to a temperature at which the thermostat 25 will reclose to reenergize cooker heater 9 and the vaporizer heater 23. Now the cycle will repeat, and in this way the system will hold the 250° cooker temperature.

Preferably, the cooker will be provided with a pressure relief and release valve 27.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a cooker and the like provided with a wall defining a cooking vessel, and also provided with heating means for applying heat to one wall area of said vessel, means for controlling said heating means responsively to the temperature of said vessel comprising, a closed vapor system having a condenser in thermal relation with a second wall area of said vessel removed from said first area, a vaporizer remote thermally from said wall areas, vaporizable liquid in said vaporizer converted into vapor therein when it is heated and condensed in said condenser and returned in the liquid phase to said vaporizer for revaporization, means for heating said vaporizer, a variable volume control chamber for receiving liquid from said vaporizer and condenser as the temperature of said condenser increases and as a result the pressure therein builds up, and a temperature-responsive element controlling said vessel heating means responsively to the temperature of said vaporizer.

2. In a cooker and the like provided with a wall defining a cooking vessel, and also provided with heating means for applying heat to one wall area of said vessel, means for controlling said heating means responsively to the temperature of said vessel comprising, a closed vapor system having a condenser in thermal relation with a second wall area of said vessel removed from said first area, a vaporizer remote thermally from said wall areas, vaporizable liquid in said vaporizer converted into vapor therein when it is heated and condensed in said condenser and returned in the liquid phase to said vaporizer for revaporization, means for heating said vaporizer, a variable volume control chamber for receiving liquid from said vaporizer and condenser in an amount depending upon the pressure in said vaporizer and condenser which pressure varies with the temperature in said condenser, means biasing said control chamber to contract with a predetermined force, and a temperature-responsive element controlling said vessel heating means and also that of said vaporizer responsively to the temperature of said vaporizer.

3. In a pressure cooker having an open top receptacle defined by a bottom wall and a side wall, a heater for applying heat to said bottom wall and means for controlling said heater to hold a preselected temperature in said receptacle responsively to the temperature thereof comprising, a condenser in thermal contact with an area of said side wall, a vaporizer removed thermally from said bottom and side walls, a heater for heating said vaporizer, conduit means interconnecting said condenser and vaporizer for the flow of vaporized medium from the vaporizer to the condenser and the return flow of the condensed medium in said condenser to said vaporizer for revaporization, a vaporizable medium in said vaporizer and condenser system, an expansible and contractible control chamber remote thermally from both said side and bottom walls, a spring element tending to contract said chamber with a predetermined force, conduit means connecting said control chamber with said vaporizer and condenser for feeding said vaporizable medium into said control chamber in an amount depending upon the relative pressure in said control chamber and in said vaporizer and condenser, and common control means for both of said heating means for said bottom wall and said vaporizer operable responsively to the temperature of said vaporizer.

4. In a cooker and the like provided with a wall defining a cooking vessel, and also provided with heating means for applying heat to one wall area of said vessel, means for controlling said heating means responsively to the temperature of said vessel comprising, a closed vapor system having a condenser in thermal relation with a second wall area of said vessel removed from said first area, a vaporizer remote thermally from said wall areas, a vaporizable medium only in said closed system, the portion of said medium in the liquid phase gravitating to said vaporizer for vaporization therein and the medium in the vapor phase generated forced into said condenser where it is condensed and returned in the liquid phase to said vaporizer, means for heating said vaporizer, and said closed system having a variable volume control chamber positioned out of thermal contact with said wall areas and provided with biasing means tending to reduce its volume, and said chamber arranged to receive medium in the liquid phase from said vaporizer and condenser in an amount depending upon the difference in the pressure of the fluid in said vaporizer and condenser and the force of said biasing means, and a temperature-responsive element controlling said vessel heating means responsively to the temperature of said vaporizer.

5. In a heat control system, a closed fluid system comprising a vaporizer and a condenser connected with it, a vaporizable medium only in said closed system, means for heating said vaporizer, said vaporizer evaporating the medium therein that exists in the liquid phase and forcing it into said condenser and said condenser condensing the medium therein that is in the vapor phase for return to said vaporizer, the condenser being related to said vaporizer so that the liquid formed in said condenser gravitates to said vaporizer, said closed fluid system further having a variable volume control chamber provided with biasing means tending to reduce its volume with a predetermined force, and said control chamber receiving medium in the liquid phase from said vaporizer and condenser in an amount depending upon the difference in pressure of the fluid in said vaporizer and condenser and the force of said biasing means.

6. In a pressure cooker comprising a cooking vessel having heating means for applying heat thereto, temperature control means for controlling said heating means comprising a closed fluid system, a vaporizable medium only in said system, said system having a vaporizer out of thermal contact with said vessel and a condenser in direct thermal contact with said vessel connected with said vaporizer so that medium in said condenser existing in the liquid phase gravitates to said vaporizer, means for heating said vaporizer, said system further having a bellows control chamber, a spring acting on said bellows tending to contract it and thereby reduce its volume, the bellows receiving medium in the liquid phase from said condenser and vaporizer when the pressure therein rises to a predetermined high value and returning it thereto when said pressure falls below said value, heating means for heating said vaporizer, and means shutting off the heating means both for said vaporizer and said vessel when the temperature of said vaporizer rises to a predetermined high value.

WALTER R. WEEKS.

REFERENCES CITED

The following references are of record in the file of this patent:

UNITED STATES PATENTS

| Number | Name | Date |
| --- | --- | --- |
| 1,875,851 | Carson | Sept. 6, 1932 |

FOREIGN PATENTS

| Number | Country | Date |
| --- | --- | --- |
| 622,282 | Germany | Nov. 25, 1935 |